(12) United States Patent
Flickinger et al.

(10) Patent No.: US 6,596,334 B1
(45) Date of Patent: Jul. 22, 2003

(54) GEL PRODUCTS FORMING SYSTEM AND METHODS OF PREPARATION

(75) Inventors: Gregory Flickinger, Chanhassen, MN (US); Philip K. Zietlow, Wayzata, MN (US); James L. Stinson, Orono, MN (US); Bernhard Van Lengerich, Plymouth, MN (US); Soumya Roy, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 320 days.

(21) Appl. No.: 09/669,660

(22) Filed: Sep. 26, 2000

(51) Int. Cl.⁷ .......................... A23L 1/05; A23L 1/0522; A23G 3/00
(52) U.S. Cl. ...................... 426/573; 426/576; 426/577; 426/578; 426/660
(58) Field of Search ................................. 426/573, 576, 426/577, 578, 250, 414, 512, 803, 660

(56) References Cited

U.S. PATENT DOCUMENTS

| | | |
|---|---|---|
| 1,627,138 A | 5/1927 | Bausman |
| 2,272,990 A | 2/1942 | Forkner et al. |
| 2,650,880 A | 9/1953 | Erickson |
| 2,855,315 A | 10/1958 | Perrozzi et al. |
| 4,515,822 A | 5/1985 | Kraig et al. |
| 4,542,033 A | 9/1985 | Agarwala |
| 4,704,293 A | 11/1987 | Moore et al. |
| 4,722,847 A | 2/1988 | Heckert |
| 4,737,375 A | 4/1988 | Nakel et al. |
| 4,784,871 A | 11/1988 | Park |
| 4,786,510 A | 11/1988 | Nakel et al. |
| 4,830,862 A | 5/1989 | Braun et al. |
| 4,853,236 A | 8/1989 | Langler |
| 4,886,678 A | 12/1989 | Chiu et al. |
| 4,961,943 A | 10/1990 | Blanthorn et al. |
| 4,988,531 A * | 1/1991 | Moore et al. ............... 426/578 |
| 4,992,282 A | 2/1991 | Mehansho et al. |
| 5,059,441 A * | 10/1991 | Bunick et al. .............. 426/515 |
| 5,084,296 A | 1/1992 | Lugay et al. |
| 5,186,965 A | 2/1993 | Fox et al. |
| 5,208,059 A | 5/1993 | Dubowik et al. |
| 5,364,643 A | 11/1994 | Morimoto et al. |
| 5,445,837 A | 8/1995 | Burkes et al. |
| 5,455,053 A | 10/1995 | Zimmermann et al. |
| 5,626,896 A | 5/1997 | Moore et al. |

(List continued on next page.)

FOREIGN PATENT DOCUMENTS

| | | |
|---|---|---|
| EP | 0422883 A | 4/1991 |
| EP | 0462692 A | 12/1991 |
| EP | 0788746 A | 8/1997 |
| GB | 752661 A | 7/1956 |
| GB | 1 564 452 | 4/1980 |
| GB | 2160083 A | 12/1985 |
| GB | 2249934 A | 5/1992 |
| JP | 03083550 A | 4/1991 |
| JP | 08173063 A | 7/1996 |
| RU | 2073985 C | 2/1997 |
| RU | 2096972 C | 11/1997 |
| WO | WO 9741738 A | 11/1997 |
| WO | WO 0205658 A | 1/2002 |

Primary Examiner—Nina Bhat
(74) Attorney, Agent, or Firm—John A. O'Toole; Douglas J. Taylor; Everett G. Diederiks, Jr.

(57) ABSTRACT

Methods of preparing a gelled dried sweetened products comprise the steps in sequence of: providing a hot fluid gelable base blend at near finish % solids, and depositing the fluid gelable base blend into shaped cavities. The present methods can further comprise the steps of rapidly curing the base blend to form gelled shaped pieces; and, separating the gelled shaped pieces from the shaped cavities to form quantities of shaped pieces. Depositing a gelable base blend at near finish solids content is possible by completely hydrating any gel hydrocolloids prior to addition to other wet and dry ingredients.

68 Claims, 4 Drawing Sheets

U.S. PATENT DOCUMENTS

| | | |
|---|---|---|
| 5,747,080 A | 5/1998 | Lemke et al. |
| 5,820,903 A | 10/1998 | Fleury et al. |
| 5,840,354 A | 11/1998 | Baumann et al. |
| 5,942,268 A | 8/1999 | Zimmermann et al. |
| 6,123,016 A * | 9/2000 | McGuire et al. .............. 99/483 |
| 6,165,531 A | 12/2000 | Harding et al. |
| 6,444,252 B1 * | 9/2002 | Gordon et al. ............. 426/573 |
| 6,458,405 B1 * | 10/2002 | Roy et al. .................. 426/575 |

* cited by examiner

GEL PRODUCTS FORMING SYSTEM AND METHODS OF PREPARATION

FIELD OF THE INVENTION

The present invention relates to improved food products and to their methods of preparation. More particularly, the present invention relates to methods for preparing confectionery gelled food products, especially fruit based.

BACKGROUND OF THE INVENTION

The present invention provides an improvement in gelled food products such as prepared by starch molding and to their methods of preparation. In particular, the present invention comprises depositing a gelable fluid mixture at or near finish moisture into shaped starch cavities. The present invention provides product preparation methods that importantly comprise shorter residence times during curing than in conventional starch molding techniques by eliminating or at least greatly reducing drying required for obtaining the finished products.

Wholesome snacks prepared from sweetened intermediate moisture shelf stable fruit or "fruit snacks" herein have recently become popular food items. These compositions are sold in various physical forms and shapes such as: 1) in rolled sheet form; 2) in rolled strip form; 3) in string form mounted on a U-board; 4) soft center filled pieces, and 5) in gelled bite size pieces of various shapes or in gelled bite size piece form prepared by starch molding.

Generally, these products are prepared from wet mixtures of the various fruit materials and added ingredients that are dried to desired moisture contents. The dehydrated compositions are formed into articles of desired shapes and sizes. In other variations, all or a portion of the fruit material is substituted with pure sugars. Such low fruit, high sugar formulations can be flavored with fruit flavors and/or other flavors. Within this general similarity, however, the particular methods of preparation, product formulations and apparatus used to prepare particular products vary considerably. Moreover, such variations are highly interdependent. Formulations and method steps suitable for one product form might or might not be suitable for another product form due to the processing difficulties, or desired end product attributes such as shape or texture.

Particularly popular products are in rolled sheet form such as are sold under the Fruit Roll-Ups brand. Popular products rolled strip form are sold under the Fruit By The Foot brand (see also, U.S. Pat. No. 5,455,053 entitled "Rolled Food Item" issued Oct. 3, 1995). Food products in string form mounted on a U-board are sold under the String Thing™ mark while other products in bite size pieces of various shapes are sold under various brands. (See, for example, commonly assigned U.S. Pat. No. 5,942,268 entitled "Embossed Shape-Food Item" issued Aug. 24, 1999 to Zimmermann et al.). Soft center filled pieces products are described in U.S. Pat. No. 4,853,236 entitled "Dual Textured Food Piece Of Enhanced Stability Using An Oil In Water EMULSION" (issued Mar. 18, 1988 to Langler et al.) while apparatus and fabrication methods therefor are described in U.S. Pat. No. 5,208,059 entitled "Dual Textured Food Piece Fabrication Apparatus" (issued Jun. 10, 1992 to Dubowik et al.).

In particular, the present invention provides further improvements in the gelled food products in bite size pieces and their starch molding methods of preparation taught in related commonly assigned U.S. Pat. No. 6,077,557 entitled "Gel Products Fortified With Calcium And Method Of Preparation" (issued Jun. 20, 2000 to Gordon et al.) and which is incorporated herein by reference. In that application, a calcium slurry is prepared and is added to other materials such as sugars and fruit purees to form a calcium bearing fluid gelable blend or slurry. The calcium bearing gelable blend is then further processed such as by forming that blend into shaped pieces by adding to shaped cavities in starch moulds and curing and drying to form finished calcium fortified gelled food pieces.

Also, the present invention further provides an improvement towards an alternative to that calcium slurry such as is disclosed in commonly assigned U.S. Ser. No. 09/596,512 entitled "Gel Products Fortified With Calcium And Methods Of Preparation" (filed Jun. 19, 2000 by Gordon et al.) and which is incorporated herein by reference.

In each of the '557 patent and U.S. Ser. No. 09/596,512, the gelable calcium bearing compositions are formed into pieces, and cured by conventional starch molding. The curing step involves the formation of the gel structure of the gelling agents, and optional heating of the products to remove excess moisture and eventual cooling down of the products to form a gel that is able to withhold its individual shape. The conventional starch molding step is practiced with extended curing time ranging from about 16 to 48 hours. While a gel structure forms early in the curing step, the lengthy duration is required by the need for substantial moisture removal from the gel into the starch.

However, in the present invention, by virtue of the present improved deposition of a gelable fluid at near finish moisture contents, the starch molding curing times can be substantially reduced.

These dried fruit products are especially popular with children, particularly as snack or convenience foods. To continue to appeal to children, manufacturers must introduce frequent changes to such products. For example, the shapes of the products can be changed to employ currently popular character shapes such as from a movie, television show, cartoons, etc. An advantage of starch molding is that such shape changes can be made quickly, cheaply, and easily.

In starch molding, shapes are stamped into a bed of starch forming cavities by a shaped die or tamper. A gelable fluid mixture is then charged to the cavities and is allowed to cure to harden and to dry to form thereby gelled food products.

One problem, however, with starch molding is that holding times for curing are lengthy and can generally range from one to several days. After curing the shaped pieces are removed from the starch. Large quantities of product, starch and holding rooms and equipment are required to provide such lengthy holding times.

Thus, it would be desirable to reduce starch molding curing times. One approach to reducing curing times is simply to increase the solids content of the fluid gelable mixture being deposited so as to reduce degree of the drying required and thus to reduce the curing time. However, increasing the solids content can also increase the viscosity of the fluid mixture, which in turn can impair the ability to properly fill the starch cavities, and thus lead to product shape defects. The mixture can also be prone to premature gelling causing fouling and other processing and starch cavity mould filling problems. Often such problems are due to inadequate hydration of one or more gelling agents or inadequate mixing of the composition due to restrictions on moisture usage.

In view of the current state of the gelled food art, there is a continuing need for new and improved formulations and methods for preparing gelled shaped food products.

The present invention satisfies this need by providing methods for preparing such starch molded gelled bite size dried fruit products that are characterized by reduced or even no drying and thus reduced curing times. In part, the present invention involves providing a gelable sweetened fruit fluid slurry of increased solids intermediate product that nonetheless (has lower or comparable viscosities) that allows for successful starch molding.

In particular, it is an object of the present invention to provide methods for preparing fortified sweetened dried gelled fruit compositions having reduced cure times.

Still another object of the present invention is to provide high solids content gelable food slurry product intermediates useful in the preparation of gelled food products.

Still another objective is to provide techniques and methods for providing such high solids gelable fluid intermediate products.

It has been surprisingly discovered that the above objectives can be realized and superior dried sweetened fruit preparation methods provided by preparing a high solids content gelable fluid by the herein described techniques that requires minimal curing times whether by reducing setting and/or drying times. The present invention further provides novel methods of preparation of such gel products characterized by reductions or elimination of drying times or by reductions or elimination of setting times.

BRIEF DESCRIPTION OF THE DRAWINGS

The illustrative embodiment may best be described by reference to the accompanying drawings where.

SUMMARY OF THE INVENTION

In its process aspect, the present invention resides in methods of preparing a gelled dried sweetened product. The methods comprise the steps in sequence of: providing a hot fluid gelable base blend at near finish % solids, and depositing the fluid gelable base blend into shaped cavities. The present methods can further comprise the steps of rapidly curing the base blend to form gelled shaped pieces; and, separating the gelled shaped pieces from the shaped cavities to form quantities of shaped pieces.

DETAILED DESCRIPTION OF THE INVENTION

Figure 1:
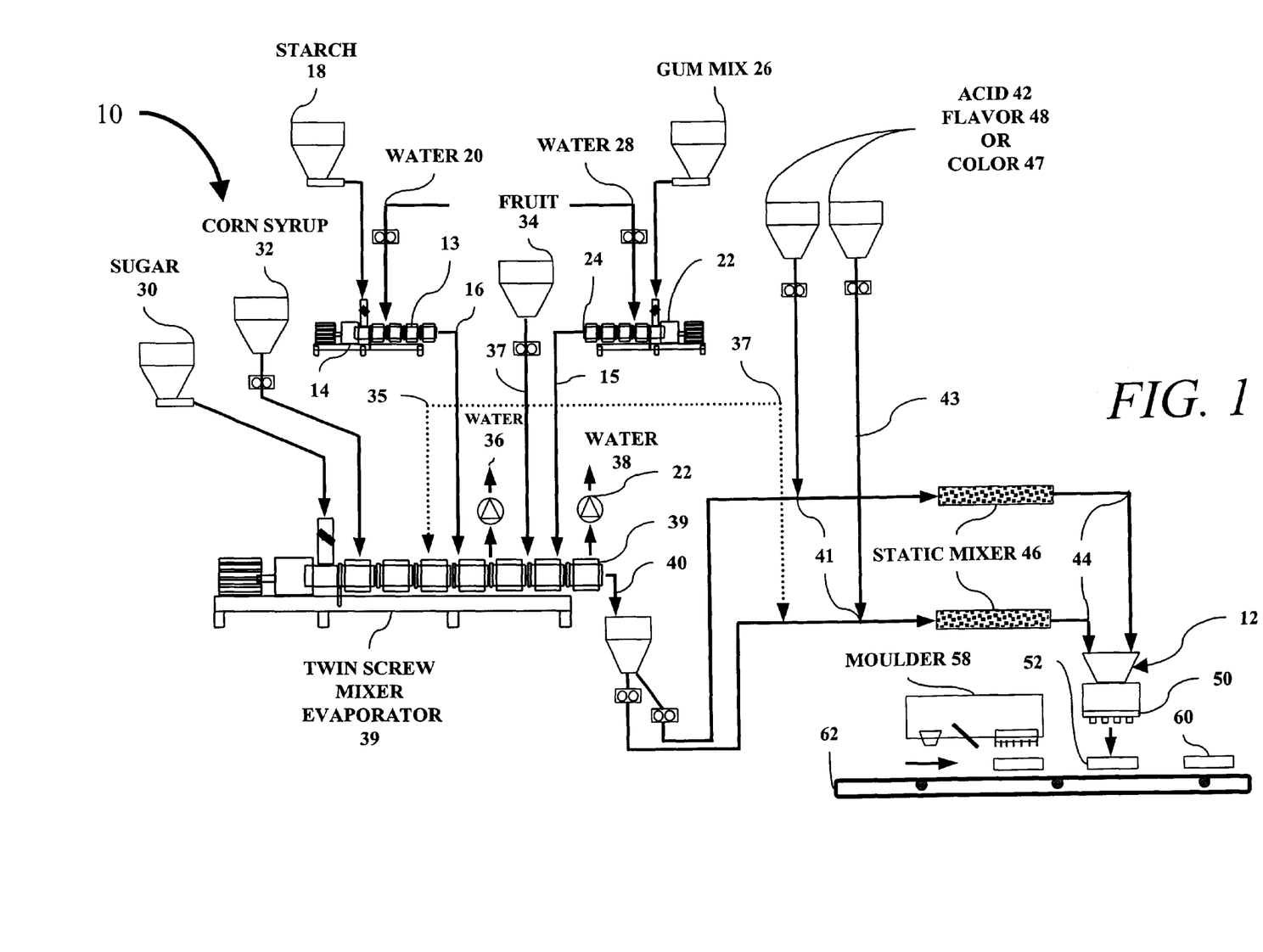
FIG. 1 is schematic flow diagram of gelled product forming system according to a process aspect of the present invention.

Referring now to FIG. 1, there is shown a gelled product forming process 10 for preparing finished gelled or semi solid confectionery food products. The process 10 essentially comprises a first step 12 of providing a hot fluid gelable base blend at or near finish % solids. While the present invention finds particular suitability for use in connection with the production of shaped gelled fruit based products, the present invention is also suitable for use in connection with the production of gelled or semi-solid food products such as jelly beans, gum drops and other gelled confections.

The present invention resides importantly in part first step 12 in the provision of gelable base blend comprising fully hydrated hydrocolloids and gelatinized starches at lower moisture contents or near finish % solids that thus require little or no drying to form finished gelled products. By "near finish moisture contents" or equivalently "near finish % solids" is meant that the fluid gelable base blend is within about ±1%–2% moisture content of the finished gelled or semi solid food product.

Step 12 generally involves mixing at least one hydrated gelling ingredient with other wet and dry ingredients and removing moisture to form a homogenous base blend 40. The base blend 40 comprises at least one gelling agent and in preferred embodiments the gelling agent comprises a blend of gel forming starches and gel forming hydrocolloids. In those variations employing an initially ungelatinized starch, step 12 involves heating the mixture to temperatures and for times sufficient to cook the starch to form the base blend 40. By "cooking" is meant at least substantially (at least 80% of the starch as measured by birefringence) if not all the starch has been gelatinized.

Conveniently, one or more continuous twin screw processors can be used to prepare the present near finish moisture gelable fluid base blend composition 40. In one variation of the preferred embodiment, a first low shear smaller twin screw processor 14 can be used to prepare, and step 12 can comprise a substep 13 of providing, a cooked or gelatinized gelling starch solution 16 comprising about 20% to 75% starch 18, preferably about 40% to 60% starch, and the balance water 20. In this variation, twin screw processor 14 is used primarily as a mixing, heating and conveying apparatus rather than to impart shear into the gelatinized starch solution. Suitable for use herein for the smaller twin screw processor(s) is a unit available from Readco Teldyne. Processor 14 further functions as a pump to supply the cooked starch solution at the elevated solids content range indicated above. The temperature of the starch solution preferably ranges from about 60° C. to 180° C.

In one embodiment, the gel forming starch is a thin boiling starch. Such thin boiling,are highly hydrolyzed such that aqueous solutions containing such thin boiling starches are characterized by being thin or as having a low viscosity. "Thin boiling starches" are an art-recognized term, such products are widely available commercially, and the skilled artisan will have no difficulty selecting such materials for use herein. Preferred embodiments herein of the base blend 40 comprise about 1.5% to about 25%, preferably about 2.5% to about 12% thin boiling starch. In variations, all or a portion of the thin boiling starch can be substituted with a high amylose gelling starch.

It is important that any gelling or thickening agents added to the fluid gelable base blend be fully hydrated but with minimal water. Conventionally, hydrocolloids or other gelling system ingredients are first hydrated in a solution comprising about 95% moisture and 5% hydrocolloids. However, in contrast, in the present invention, desirably a hydrated gelling ingredient or blend of gelling ingredient(s) comprises about 25%–75% moisture and about 75%–25%, ingredients.

A second smaller sized twin screw processor 22 can be used to prepare, and step 12 can further comprise, a substep 15 of providing a high solids content hydrated hydrocolloid solution 24 in a continuous fashion comprising about 5% to 30% on or more gelling hydrocolloids 26, preferably about 10% to 20% hydrocolloid(s), and the balance water 28. Similar to processor 16, processor 20 can be used to hydrate and heat water and hydrocolloid to form hydrated hydrocolloid solution and processor 16 feeds a surge hopper with a pump to supply the high solids hydrated hydrocolloid solution. Substep 15 of providing a low moisture but fully hydrated hydrocolloid solution is important to obtaining the high % solids base blend 40. In contrast, conventional or prior art hydrocolloid hydration methods provides hydrocolloid solutions that have at most about 5% hydrocolloid solids. The temperature of the hydrated hydrocolloid solution preferably ranges from about 55° C. to about 220° C.

Sufficient amounts of gelling hydrocolloids (such as alginates, gellans, pectin, carrageenans, gelatin and mixtures thereof) and gelable starch are employed to provide a gel strength in the finished product of about 1 to 8 Kg/cm² force. Good results are obtained when-the finished product comprises about 1% to 5% starch (dry weight basis) and about 0.5% to 2% hydrocolloid(s). Such gelling hydrocolloids can be thermo setting, calcium or acid setting types.

FIG. 1 further depicts that first step 12 can further comprise a substep of admixing 17 one or more sugar components such as a dry sucrose 30, corn syrup 32, and in preferred variations fruit materials 34, and heating to form a base blend 40. As the mixture is heated or cooked, water 36 can be removed such as by venting (with or without vacuum) to adjust the mixture to desired moisture content levels. Of course such moisture removal can result in reductions in temperature of the mixture. In preferred variations, heat sensitive flavor materials such as the fruit 34 are added after the moisture removal 19 and any such temperature reductions to minimize exposure to elevated temperatures. However, the step 12 can involve further heating and water removal 38 such as to remove all or a portion of the water added associated with the addition of the fruit 34. In still other optional variations (and so indicated by the dotted lines), the addition of the fruit 34 can be adjusted (whether in whole or in part) to earlier or later in the step to facilitate moisture removal (such as by earlier fruit addition 35) or to minimize exposure to heat (such as by later fruit addition 37). In another variation (not shown), all or a portion of the fruit material 34 can be used in substitution for all or a portion of the water 28 used to hydrate the gelling hydrocolloid to produce hydrated hydrocolloid supply 24.

FIG. 1 depicts that a third larger twin screw mixing processor 39 can be employed to admix or blend the ingredients such as sugars 30, corn syrup 32, fruit 34, and other ingredients (not shown) and cook to form a heated fluid gelable base blend 40 having a near finish moisture content. If desired, supplemental heating (not shown) can be provided in the form of indirect heat (e.g., by a steam or oil jacket or by induction heating) to the barrel of processor 39, or supplied by injected steam (not shown) or various forms and combinations of heating.

Conveniently, the fruit material 34 is concentrated fruit juice and/or puree having a solids content of about 30% to about 85%, preferably about 65%,to about 75%.

Figure 2:
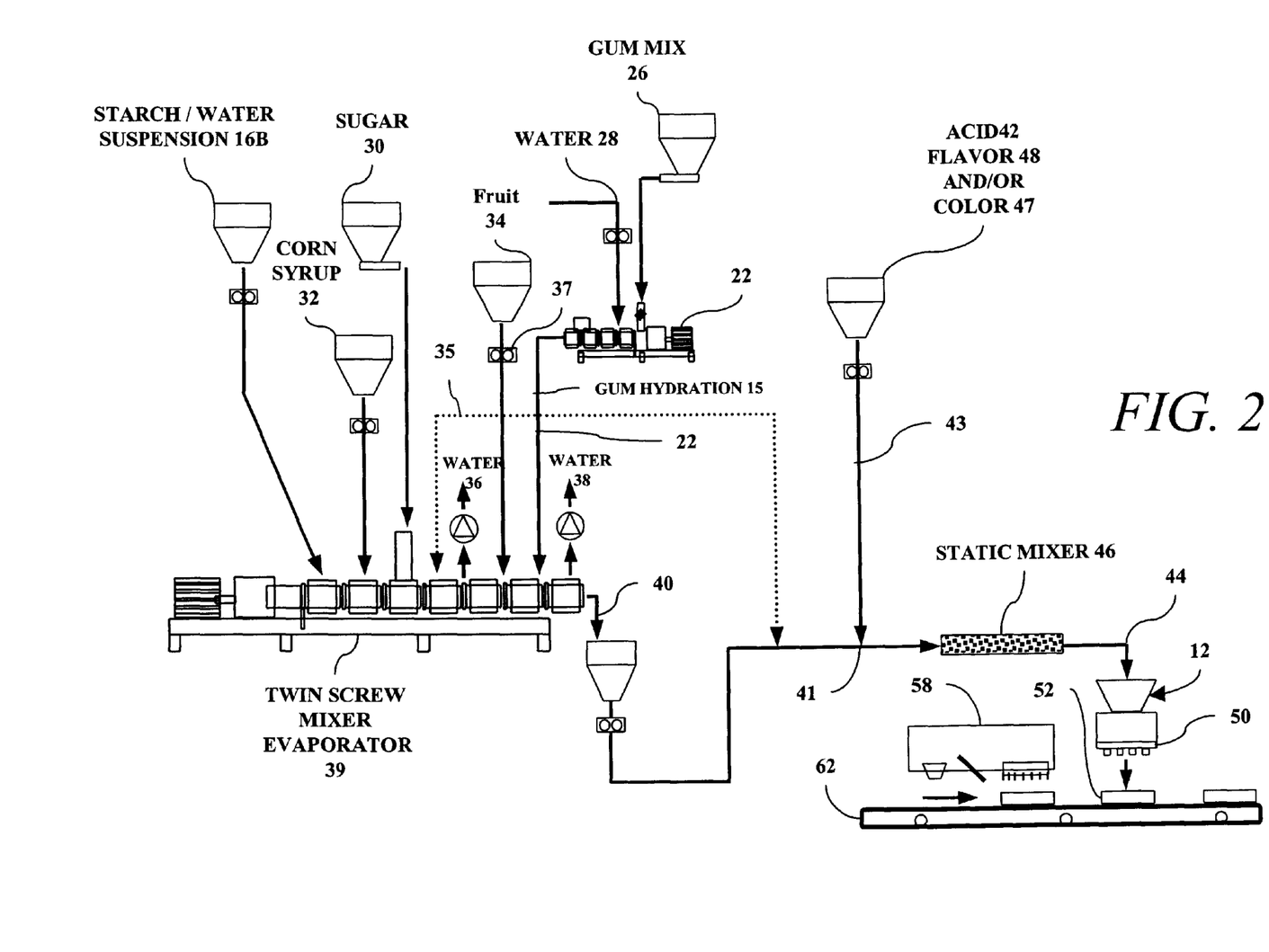
FIG. 2 is schematic flow diagram of gelled product forming system according to a process aspect of the present invention similar to FIG. 1 except that starch cooking is performed in the same twin screw cooker processor as performs the mixing.

Reference now is made briefly to FIG. 2 that shows a variation of step 12 in which the starch cooking substep 13 is practiced in the larger processor 39 rather than in a separate processor as depicted in FIG. 1. In FIG. 2, a "cold" (i.e., below the temperature for starch gelling or less than 80° C.) aqueous suspension of starch in water 16B is fed to processor 39. An advantage of this variation is that fewer equipment units can be employed. However, the length, configuration and heating of processor 39 must be adjusted so that the starch gelatinization substep 13 can be practiced in processor 39. In these variations employing an initially ungelatinized starch, the mixtures in processor 39 is also heated to temperatures and times sufficient to cook the starch at least in the first sections of processor 39. By "cooking" is meant at least substantially if not all the starch has been gelatinized. In a less preferred variation (not depicted) also involving only two processors, the hydrocolloid hydration substep 15 is practiced in processor 39 while the starch-cooking substep is practiced in a second smaller processor or other cooking vessel.

FIG. 1 further depicts that step 12 can further comprise a substep of admixing 41 to the base blend 40 an edible organic acid 42 (e.g., citric, succinic, malic, ascorbic acid or mixtures thereof). In certain variations, the base blend 40 can comprise a gel forming hydrocolloid(s) that forms a gel under acidic conditions. In this variation, acid addition to the base blend 40 forms the gelable base blend 44. In other variations wherein the base blend does not require such acidic conditions to be gelable, the acid addition 41 can be for providing or promoting desirable flavor. For those gel forming gelling hydrocolloids that form gels at lower pH, the addition of acid 42 after moisture content adjustment and just prior to the to-be described depositing step 50 facilitates deposition of the high solids content gelable base blend. The later addition of the gel promoting acid depicted delays premature gel formation or premature increases in the viscosity of the gelable base blend 44.

The acid addition can be in the form of adding 42 a concentrated aqueous solution 43 so as to minimize moisture addition and thus to minimize or eliminate and require subsequent drying. The admixture of the acid solution 43 can be assured by employing at least one static mixer 46 or other mixing technique.

In another variations in which the base blend 40 comprises a gelling agent that is calcium set (such as Kappa carrageenan), the acid can be substituted with an aqueous soluble calcium ion solution (e.g., 0.1%–1% soluble calcium) to form the gelable base blend 44. In still other variations, since potassium ions can affect the gel strength of kappa caragenan, a portion of the calcium solution can be substituted with a potassium ion solution or additionally include a potassium ion content.

Step 12 can further involve addition of supplemental color 47 and/or flavor 48. Conveniently, the color 47 and flavor 48 can be premixed with the acid 41 as depicted in FIG. 1. In variations, the base blend 40 can be prepared from bland materials (e.g., apple or pear puree and/or white grape juice) so as to have a neutral-flavor and color. If desired, the base blend 40 can be divided into a plurality of substeams (not shown) and different combinations of flavors 47 and colors 48 admixed with each substream so as to conveniently provide individually colored and flavored substeams.

In still another variation (not shown), supplemental vitamins, minerals, nutriceuticals, botanicals, therapeutic, and even pharmaceutical additives can be added to the base blend (especially before static mixer 46). In one preferred variation, high levels (e.g., about 0.5% to 5% by dry weight) of insoluble calcium (e.g., powdered calcium phosphate and/or calcium carbonate). In other variations, these nutritional supplements can be further admixed with one or more additional static mixer elements (not shown) or employing those static mixers used to blend colors, flavors, and or acids.

Also not shown, one or more of the substeams can be aerated if desired or combined with aerated substeams of similar or differently formulated compositions, e.g., marshmallow.

In still other variations, (not shown) air, nitrogen or other gases can be added before the static mixers to aerated the gelable blend 44 to densities ranging, for example from about 0.1 to 0.8 g/cc., preferably to about 0.2 to 0.5 g/cc.

Figure 3:
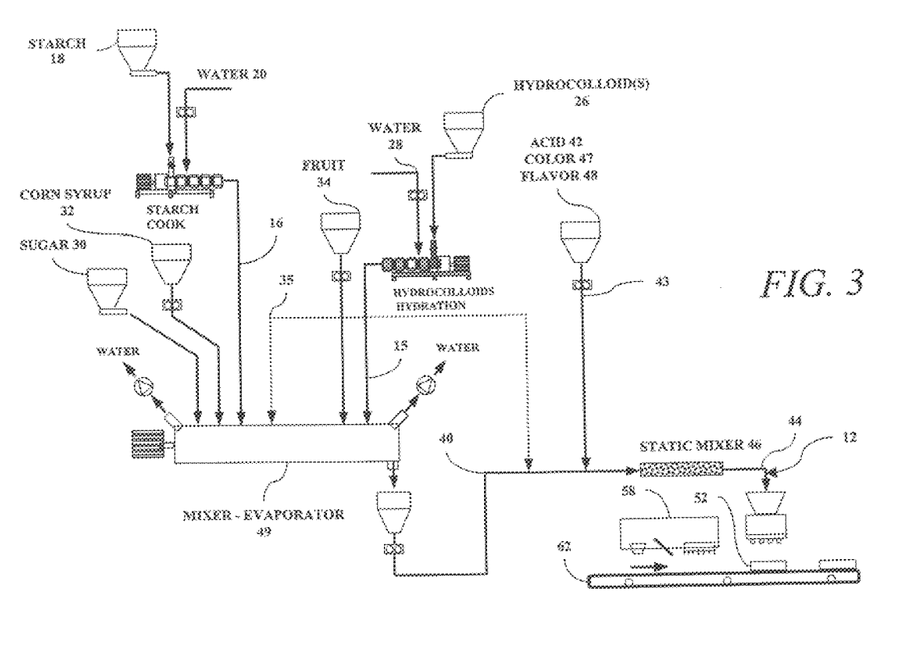
FIG. 3 is schematic flow diagram of gelled product forming system according to a process aspect of the present invention similar to FIG. 1 with the substitution of an alternative cooking apparatus.

Reference is now made briefly to FIG. 3 that depicts that in still another variations of one and the same invention, other conventional food mixing and heating processing equipment can be employed to practice the finish heating and mixing. FIG. 3 is similar to FIG. 1 except that a mixer evaporator 49 is used in substitution for the twin screw processor 39 depicted in FIG. 1. Equipment suitable for practicing the cooking substep is commercially available. Suitable for use herein is any mixing device, whether batch or continuous, having heat transfer and mixing means. Preferred for use to practice the cooking step is a heated agitated cooking vessel such as is available from Bepex Corporation. The vessel is a jacketed horizontally extending apparatus having a rotating axially aligned interior shaft having a multitude of adjustable paddles extending radially from the shaft. The rotating paddles act as a mechanical agitator and effectively mix the wet and dry ingredients. The paddle arrangement and agitator tip speed combine to move the sugar material in a thin annular spiral from the inlet to discharge of vessel 14. The Bepex heated vessel or "turbolizer" has the advantage since it is a relatively simple and thus less expensive piece of equipment. Less preferred but nonetheless also suitable for use herein to practice the cooking step is a conventional swept surface heat exchanger. While useful, a swept surface heat exchanger is less desirable since it is a more complicated and thus more expensive piece of equipment compared to a heated turbolizer. In still other variations, one or more kettles can be used to practice the gelable base blend preparation step.

Figure 4:
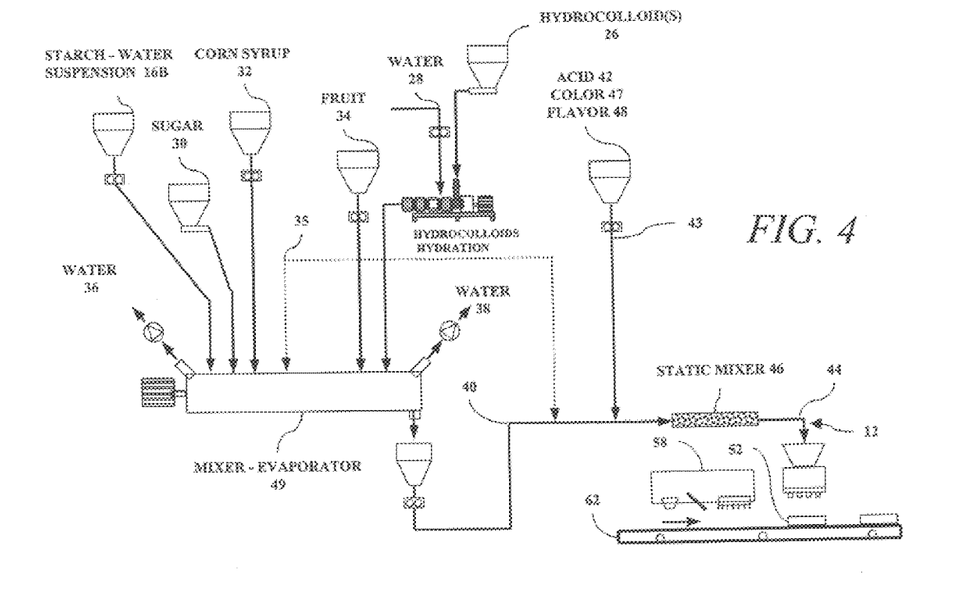
FIG. 4 is schematic flow diagram of gelled product forming system according to a process aspect of the present invention similar to FIG. 2 with the substitution of an alternative cooking apparatus.

A brief reference is made now to FIG. 4 which depicts a variation similar to FIG. 2 but like in the variation depicted in FIG. 3, substitutes a heating and mixing apparatus 53 in substitution for the twin screw processor 39 of FIG. 1. In the variation depicted in FIG. 4, the heating and mixing apparatus 53 functions to practice the cooking of 16B the gelling starch of the cold starch and water dispersion in a manner comparable to that described above for FIG. 2.

In highly preferred embodiments, the gelable fluid base blend 44 is characterized by a solid content of about 80 to 85% solids and a sugars content of about 55% to about 80%. The solids content includes ant emulsifiers or fats added, for example, as processing aides.

At the beginning of this depositing step 50, importantly the gelable slurry 44 is in the form of a viscous but pumpable fluid or plastic mass so that the compositions can take the shape of the mould even if complexly shaped. In certain variations, the pumpable gelable base blend 44 is in the form of a hot fluid. If, however, the slurry 44 is too viscous or is allowed to cool to below the gelling temperature of the carrageenan, then the shapes taken can be defective.

Referring now again to FIG. 1, there is shown that product forming process 10 further essentially comprises a second step 50 of depositing the fluid gelable base blend into shaped cavities. In preferred embodiments, the depositing step is practiced immediately after the admixing of the gel promoting acid addition. Good results are obtained when the residence time between the acid admixture and the deposition step is less than 10 seconds, preferably less than five seconds. Practicing the depositing step immediately thereafter minimizes the problems associated with increases in viscosity build-up resulting from the acid addition.

The temperature of the fluid gelable base blend typically ranges from about 50° C. to about 100° C., preferably about 80° C. to about 90° C. As noted above, the base blend 44 should be at least plastic and preferably fluid in nature. Good results are obtained when the base blend has a viscosity that ranges from about 5,000 cps. to about 30,000 cps. At the deposition temperature. Such a fluid property is helpful to minimizing problems in shape formation of the resultant piece in the shaped cavities.

A variety of techniques can be used to practice the depositing into shaped cavities step. For example, the depositing step 50 can involve the substep of forming shaped cavities into powdered starch beds 52 such as by using shaped male dies or tampers (not shown) in moulders 58 and thereafter filling the shaped starch bed cavity lies with the gelable fluid. Starch molding apparatus are widely used in the confection art and the skilled artisan will have no difficulty selecting suitable equipment for use herein. If desired, the cavities can be shaped and sized to receive about 1 to 10 g of gelable base blend 44 each.

In a novel variation herein, shaped cavities can be formed in a bed of powdered sugar (whether dextrose, sucrose or mixtures thereof) especially having a particle size of less than 50 microns or even a combination of starch and powdered sugar(s), e.g., a 50:50 blend of starch and sugar(s).

In another variation (not shown), the shaped cavities can be supplied by silicone fixed shape moulds (see for example the above referenced and incorporated U.S. Pat. No. 5,208,059). In still another variation, thermoformed plastic disposable containers that also serve as end product packaging can provide the shaped moulds. In this variation, at least a single piece can be formed in each plastic mould. In a preferred variation, the shaped plastic molds are formed immediately prior to being filled with the gelable blend 44. For example, the plastic mould can be fabricated from a flexible plastic film. If desired, the plastic mould can also be sealed so that the plastic mould also forms the end product package. Of course, other shaped moulds and techniques can be used to practice step 50.

Surprisingly, in a highly preferred variation, the step can further comprise an intermediate step of cooling the shaped cavities to a temperature of less than room temperature (i.e., about 25° C.) prior to the sub-step of filling with the hot gelable fluid. In more preferred embodiments, the shaped cavities are cooled to a temperature of about −50° C. to about 5° C. prior to filling with the hot fluid gelable base blend. Cooling prior to filling, especially of starch or powdered sugar bed cavities, accelerates the to-be-described curing step. Such curing step acceleration allows for not only dramatic increase in productivity but also reductions in equipment and facilities' costs. The starch or powdered sugar bed can be cooled such as in a freezer or cooling room or cooling tunnel for periods sufficient that the entire bed has a temperature of about −50° C. to about 25° C. Cooling the starch or powdered sugar beds to even colder temperatures can be practiced but, at present, cooling to such even lower temperatures is neither especially beneficial nor economically practical. Conveniently, the cooled starch bed or powdered sugar bed is then stamped with the shaped tampers to form shaped cavities in the cooled.

FIG. 1 further depicts that product forming process 10 can further comprises a step 60 of rapidly curing the gelable base disposed within or filled into the shaped cavities blend during which the compositions are allowed to set to form gelled or shape stable shaped pieces. During the curing step 60, the temperature of the hot fluid gelable base blend 44 cools to below the gelling temperature of at least one of the gel forming ingredients. Good results are obtained when the cure time ranges from about 0.1–200 minutes. In preferred variations, the curing step 60 can range from about 1 to 15 minutes and more preferably about 1 to about 8 minutes. In preferred variations, the gelled pieces are cooled to temperatures of about 25° C. to about 50° C. It is an advantage of the present invention that curing times are greatly reduced compared to conventional starch molding techniques.

Providing sufficient rest time in any convenient manner can practice the curing step 60. For example, a conveyor belt 62 can be designed with speeds and lengths sufficient to provide the cure time. In other variations, the filled moulds can be placed in a storage area. Supplemental cooling can be provided to reduce the cure time to within the desired range such as by advancing the filled shaped moulds through a cooling tunnel or chill room and/or by pre-chilling the moulds before filling as described above.

For those variations involving curing in powdered starch or sugar shaped moulds, the pieces can experience some drying during the curing step. However, the extent of drying is much less than conventional starch drying methods and involves herein a drying moisture reduction of less than 2% moisture, preferably moisture or drying reduction of less than 1%.

Product forming process 10 can further comprises a step separating the gelled shaped pieces from the shaped cavities to form quantities of shaped pieces (not shown). In certain variations wherein the shaped mould is used as part of the products final packaging, such a step is not essential to the preparation of finished products. In those variations involving starch or powdered sugar beds, the separating step can involve such as by scalping or sifting the starch or sugar to separate the larger shaped finished shaped pieces from the powdered sugar or starch. It will be appreciated that a small portion of the starch or sugar from the curing beds might remain with the cured pieces.

If desired, the present methods 10 can be practiced by including recycling or recirculating the recovered starch and/or sugar to the starch bed filling sub-step (not shown).

The pieces so formed can range in size from about 2 to 10 g, preferably about 1 to 5 g. In preferred embodiments, the gel pieces are formed into desired shapes having an ornamental configuration such as geometric shapes or shapes of animal, characters, familiar objects, or vehicles.

The individually shaped pieces can then be subsequently packaged in conventional manner. Especially useful are moisture sealed pouches fabricated from flexible film packaging impermeable flexible holding about 1 to 50, preferably about 5 to 15 individual pieces collectively weighing about 1 to 150 g, preferably 25 to 50 g.

The finished products are soft, gelled pliable products of both good flavor and eating quality. The products exhibit good initial flavor characteristics as well as prolonged resistance to flavor and texture degradation at room temperature storage. The food products so formed are characterized by being nutritious, wholesome snacks.

In further variations of the present invention, the gel food pieces can be provided with a topical coating (not shown). The methods of preparation 10 can further comprise a step of applying a topical coating 80. In one variation, the topical coating application step can involve applying a coating comprising a liquid oil optionally admixed with a wax to provide coated finished calcium fortified food pieces having a desirable shiny appearance. A blend of liquid oil and paraffin in a weight ratio of about 5:1 to about 15:1 is heated to a temperature of about 110° F. to 140° F. (45° C. to 60° C.). The oil/wax blend is applied in an enrober in a weight ratio of gel food pieces to oil/wax coating of about 100:1 to about 1000:1.

In another variation, the topical coating can involve applying (with moisture) a granular sugar coating to form a "sugared" coating to provide a "sugared" type coated gel food piece. The sugar can be a larger or granulated sugar (e.g., about 250 to about 500 microns in size) that is of a larger particle size than the powdered sugar used in the powdered sugar curing bed. In still other variations, the sugared coating can additionally additional insoluble calcium salts. In still other variations, the coating step can involve a panning operation to provide a hard shell or candy coating. In addition, the application of a granular acid such as citric acid to the surface is possible. The weight ratio (dry basis) of gel food piece to coating ranges from about 10:1 to about 100:1, preferably about 15:1 to about 50:1.

The gel food products so prepared can be conventionally packaged and distributed.

What is claimed is:

1. A process for preparing a gelled food product, comprising the steps of:
    A. providing a pumpable gelable base blend at or near finish % solids; and,
    B. depositing the fluid gelable base blend into shaped cavities, within the shaped cavities being each adapted to receive about 1–100 g of the fluid gelable base blend.
2. The process of claim 1, additionally comprising the step of:
    C. rapidly curing the base blend to form gelled shaped pieces.
3. The process of claim 2 wherein the curing step C is practiced for a cure time ranging from about 1–200 minutes.
4. The process of claim 3 wherein the cure time ranges from about 1 to 30 minutes.
5. The process of claim 4 wherein the cure time ranges from about 1 to 10 minutes.
6. The process of claim 1 wherein step A comprises the substep of mixing wet and dry ingredients to form an homogenous base blend.
7. The process of claim 6 wherein the base blend comprises at least one gelling agent.
8. The process of claim 7 wherein step A further comprises the substeps of providing a hydrated gelling agent solution comprising about 5% to 50% gelling agent and the balance moisture and admixing the hydrated gelling agent solution with the wet and dry ingredients.
9. The process of claim 7 wherein at least a portion of step A is practiced in at least one twin screw processor.
10. The process of claim 7 wherein at least a portion of the gelling agent is a starch.
11. The process of claim 10 wherein at least a portion of the starch is a thin boiling starch.
12. The process of claim 7 wherein at least a portion of the gelling agent is a gel forming hydrocolloid.
13. The process of claim 7 wherein a portion of the gelling agent is a gel forming hydrocolloid and a portion of the gelling agent is selected from the group consisting of a gel forming starch, a high amylose starch and mixtures thereof.

14. The process of claim 6 wherein at least a portion of the wherein at least a portion of the hydrocolloid is a calcium setting hydrocolloid and wherein step A includes the substep of admixing a soluble calcium ion solution into the gelable base blend prior to step B.

15. The process of claim 6 wherein at least a portion of the gelling agent is a starch.

16. The process of claim 15 wherein step A comprises forming an aqueous dispersion of ungelatinized starch and admixing the aqueous dispersion of ungelatinized starch with the wet and dry ingredients to form an homogeneous base blend.

17. The process of claim 16 wherein the base bend is heated and cooked to at least partially gelatinize the starch to form a cooked gelable hot fluid base blend.

18. The process of claim 17 wherein moisture is removed from the cooked gelable hot fluid base blend.

19. The process of claim 18 wherein at least a portion of the moisture is removed under vacuum or atmospheric venting.

20. The process of claim 17 wherein at least a portion of the heating is supplied by steam.

21. The process of claim 20 wherein the steam is injected into the base blend.

22. The process of claim 19 wherein the base blend comprise fruit solids and wherein the fruit solids are admixed with the base blend after at least a portion of the moisture is removed under vacuum.

23. The process of claim 22 wherein the base blend is fortified with at least one member selected from the group consisting of vitamins, minerals, botanicals, nutriceuticals, therapeutic agents, pharmaceutical agents, and mixtures thereof.

24. The process of claim 6 wherein at least a portion of the mixing is practiced in an mixer evaporator.

25. The process of claim 1 wherein in step A, the gelable base blend ranges in temperature from about 80° C. to about 150° C.

26. The process of claim 1 wherein at least a portion of the base blend is fruit solids.

27. A process for preparing a gelled food product, comprising the steps of:
  A. providing a pumpable gelable base blend at or near finish % solids;
  B. depositing the fluid gelable base blend into shaped cavities; and
  C. rapidly curing the base blend to form gelled shaped pieces, wherein the curing step C is practiced for a cure time ranging from about 1 to 60 minutes.

28. The process of claim 27 additionally comprising the step of:
  D. separating the gelled shaped pieces from the shaped cavities to form quantities of shaped pieces.

29. The process of claim 28 wherein the shaped cavities are formed in a bed of powdered starch, sugar(s), or mixtures thereof.

30. The process of claim 29 wherein the shaped cavities are formed in a bed of powdered starch.

31. The process of claim 29 wherein the bed is powdered sugar.

32. The process of claim 31 wherein at least a portion of the powdered sugar is dextrose monohydrate.

33. The process of claim 29 wherein at least a portion of the hydrocolloid is an acid setting hydrocolloid.

34. The process of claim 29 wherein at least a portion of the hydrocolloid is a calcium setting hydrocolloid.

35. The process of claim 34 wherein at least a portion of the calcium setting hydrocolloid is kappa carrageenan.

36. The process of claim 29 wherein step B includes the substeps of:
  cooling the powdered bed to below room temperature to form a cooled powdered bed;
  forming shaped cavities in cooled powdered bed; and,
  filling the cavities in the cooled powdered bed with the pumpable gelable base blend.

37. The process of claim 36 wherein the bed is cooled to a temperature ranging from about −50° C. to about 25° C.

38. The process of claim 29 wherein the bed is cooled to a temperature ranging from about −50° C. to about 5° C.

39. The process of claim 38 wherein the bed is powdered sugar.

40. The process of claim 38 wherein the bed is powdered starch.

41. The process of claim 29 wherein at least a portion of the gelling hydrocolloid is thermosetting.

42. The process of claim 28 wherein the shaped cavities are formed in a silicone or plastic mould.

43. The process of claim 42 wherein shaped cavities are formed in a plastic mould immediately before filling.

44. The process of claim 28 wherein the shaped cavities are formed in a mould fabricated from a thermoplastic.

45. The process of claim 28 additionally comprising the step of:
  E. packaging at least one of the shaped pieces in package fabricated from a flexible film.

46. The process of claims 27 wherein the shaped cavities are each adapted to receive about 1–100 g of the hot fluid gelable base blend.

47. A process for preparing a gelled food product, comprising the steps of:
  A. providing a pumpable gelable base blend at or near finish % solids, wherein the gelable base blend has a solids content of about 80% to 90%; and,
  B. depositing the fluid gelable base blend into shaped cavities.

48. The process of claim 47 wherein the gelable base blend has a sugars content of about 50% to 85%.

49. A process for preparing a gelled food product, comprising the steps of:
  A. providing a pumpable gelable base blend at or near finish % solids; and,
  B. depositing the fluid gelable base blend into shaped cavities, wherein step A includes the substep of admixing a color or flavor solution into the gelable base blend prior to step B.

50. The process of claim 49 comprising the step of dividing the hot fluid gelable base blend into a plurality of substeams.

51. The process of claim 50 comprising admixing a color or flavor solution into at least one substream of gelable base blend prior to step B to form a flavored or colored substream.

52. The process of claim 50 wherein at least one substream is aerated to about 0.1 to 0.9 g/cc.

53. The process of claim 49 wherein each substream is filled in separate shaped cavities.

54. The process of claim 49 wherein at least one substream is deposited into shaped cavities formed in a bed of powdered starch, sugar(s), or mixtures thereof.

55. A process for preparing a gelled food product, comprising the steps of:
  A. providing a pumpable gelable base blend at or near finish % solids; and,
  B. depositing the fluid gelable base blend into shaped cavities, wherein step A includes the substep of admixing an edible organic acid solution into the gelable base blend prior to step B.

56. The process of claim 55 wherein at least a portion of the hydrocolloid is an acid setting hydrocolloid.

57. A process for preparing a gelled food product, comprising the steps of:
   A. providing a pumpable gelable base blend at or near finish % solids, wherein the base blend is fortified with about 0.5% to 5% of calcium; and,
   B. depositing the fluid gelable base blend into shaped cavities.

58. The process of claim 57 wherein at least a portion of the calcium is supplied by calcium phosphate, calcium carbonate, and mixtures thereof.

59. The process of claim 58 wherein the calcium has a particle size of less than 100 microns.

60. In a method of preparing a starch molded confectionery comprising the addition of a hot fluid gelable to shaped cavities formed in a starch bed, the improvement comprising: cooling the starch bed to below room temperature prior to forming the shaped cavities therein.

61. The process of claim 60 wherein the starch bed is cooled to a temperature ranging from about −50° C. to about 25° C.

62. The process of claim 61 wherein the starch bed is cooled to a temperature ranging from about −50° C. to about 5° C.

63. In a method of preparing a starch molded confectionery comprising the addition of a hot fluid gelable to shaped cavities formed in a starch bed, the improvement comprising: replacing at least a portion of the starch with powdered sugar.

64. The process of claim 63 wherein all the starch is replaced with powdered sugar.

65. The method of claim 63 wherein the bed is cooled prior to forming the shaped cavities.

66. The method of claim 63 wherein the hot gelable fluid has a solids content of about 80° to 85% solids.

67. The method of claim 63 wherein at least a portion of the sugar is sucrose.

68. The method of claim 63 wherein at least a portion of the sugar is dextrose monohydrate.

* * * * *